United States Patent
Klassen et al.

(10) Patent No.: US 10,507,345 B2
(45) Date of Patent: Dec. 17, 2019

(54) FUEL CELL DEVICES FOR FIRE PREVENTION ON-BOARD AIRCRAFT

(71) Applicant: Zodiac Aerotechnics, Plaisir (FR)

(72) Inventors: Samuel Klassen, Haiger (DE); Franck Masset, Saint Georges Motel (FR); Andreas Hoogeveen, Enkhuizen (NL); Hanane Zraaia, Viry-Chatillon (FR); Loic Bouillo, Saint Just Saint Rambert (FR); Christian Thiry, Rueil-Malmaison (FR); Guillaume Gager, Toulouse (FR); Charles Foncin, Saint Cyr l'Ecole (FR); Jakub Landa, Plzen (CZ); Remko Schiphorst, Enkhuizen (NL)

(73) Assignee: Zodiac Aerotechnics, Plaisir (FR)

( * ) Notice: Subject to any disclaimer, the term of this patent is extended or adjusted under 35 U.S.C. 154(b) by 0 days.

(21) Appl. No.: 15/545,350

(22) PCT Filed: Jan. 22, 2016

(86) PCT No.: PCT/IB2016/050326
§ 371 (c)(1),
(2) Date: Jul. 21, 2017

(87) PCT Pub. No.: WO2016/116898
PCT Pub. Date: Jul. 28, 2016

(65) Prior Publication Data
US 2018/0001124 A1    Jan. 4, 2018

Related U.S. Application Data

(60) Provisional application No. 62/106,493, filed on Jan. 22, 2015.

(51) Int. Cl.
*A62C 99/00*  (2010.01)
*B64D 41/00*  (2006.01)
(Continued)

(52) U.S. Cl.
CPC ............ *A62C 99/0018* (2013.01); *A62C 3/08* (2013.01); *A62C 3/16* (2013.01); *A62C 5/006* (2013.01);
(Continued)

(58) Field of Classification Search
CPC ....... A62C 5/006; A62C 99/0018; A62C 3/08; A62C 3/16; B64D 37/32; B64D 11/04; B64D 2041/005; B64D 2221/00
(Continued)

(56) References Cited

U.S. PATENT DOCUMENTS 3,830,307 A * 8/1974 Bragg ...................... A62C 3/06
169/9
4,223,175 A * 9/1980 Crew ....................... A62C 3/16
169/48

(Continued)

FOREIGN PATENT DOCUMENTS

| CA | 2700658 A1 | 4/2009 |
|---|---|---|
| DE | 102006042300 B4 | 9/2008 |

(Continued)

OTHER PUBLICATIONS

International Application No. PCT/IB2016/050326, Search Report and Written Opinion dated Apr. 6, 2016.

*Primary Examiner* — Steven J Ganey
*Assistant Examiner* — Joseph A Greenlund
(74) *Attorney, Agent, or Firm* — Kilpatrick Townsend & Stockton LLP; Dean W. Russell; Kristin M. Crall

(57) ABSTRACT

Described are inerting systems that may be used on board an aircraft or other passenger transportation vehicle to reduce a risk of fire due to electronic components or to other elements in a compartment and to assist in preventing or extinguishing any fire or hazardous condition that may occur. The systems include a source of inert gas such as oxygen (Continued)

depleted air generated from a fuel cell on board the aircraft. The oxygen depleted air or other inert gas is conveyed through ducts to compartments that house the electronics, thus changing the conditions in the compartment to be less conducive to fire.

16 Claims, 5 Drawing Sheets

(51) Int. Cl.
    *A62C 3/16*      (2006.01)
    *B64D 37/32*      (2006.01)
    *A62C 3/08*      (2006.01)
    *A62C 5/00*      (2006.01)
    *B64D 11/04*      (2006.01)

(52) U.S. Cl.
    CPC ............ *B64D 37/32* (2013.01); *B64D 41/00* (2013.01); *B64D 11/04* (2013.01); *B64D 2041/005* (2013.01); *B64D 2221/00* (2013.01)

(58) Field of Classification Search
    USPC ........................................ 169/45, 53, 62, 11
    See application file for complete search history.

(56) References Cited

U.S. PATENT DOCUMENTS

| | | | | |
|---|---|---|---|---|
| 4,351,394 A * | 9/1982 | Enk | ............ | A62C 3/08 169/16 |
| 6,012,532 A * | 1/2000 | Kiefer | ............ | A62C 3/02 169/26 |
| 6,145,599 A * | 11/2000 | Mumme | ............ | A62C 3/06 169/12 |
| 6,601,653 B2 * | 8/2003 | Grabow | ............ | A62C 3/08 169/11 |
| 7,153,446 B2 * | 12/2006 | Grigg | ............ | A62D 1/00 252/3 |
| 7,759,011 B2 * | 7/2010 | Hoffjann | ............ | B64D 37/32 244/135 R |
| 7,900,709 B2 * | 3/2011 | Kotliar | ............ | A62C 3/0221 169/14 |
| 7,952,329 B2 * | 5/2011 | Steffler | ............ | G07C 5/085 307/66 |
| 7,968,242 B2 * | 6/2011 | Yoshizumi | ......... | H01M 8/04089 429/408 |
| 7,987,940 B2 * | 8/2011 | Bryson | ............ | A62C 3/07 169/20 |
| 8,015,973 B2 * | 9/2011 | Geary | ............ | B64D 13/06 128/202.22 |
| 8,141,185 B2 * | 3/2012 | Hoffjann | ............ | B60R 15/02 4/664 |
| 8,256,524 B2 * | 9/2012 | Bleil | ............ | A62C 3/08 169/11 |
| 8,813,860 B2 * | 8/2014 | Bleil | ............ | A62C 99/0018 169/11 |
| 8,925,865 B2 * | 1/2015 | Stolte | ............ | B64D 25/00 244/129.2 |
| 9,072,921 B2 * | 7/2015 | Ribarov | ............ | A62C 3/08 |
| 9,415,872 B2 * | 8/2016 | Godecker | ............ | B64D 11/04 |
| 9,577,433 B2 * | 2/2017 | Schroeter | ............ | B64D 41/00 |
| 9,825,318 B2 * | 11/2017 | Kato | ............ | H01M 8/04388 |
| 9,871,260 B2 * | 1/2018 | Ribarov | ............ | H02K 7/1823 |
| 9,963,240 B2 * | 5/2018 | Boodaghians | ......... | B64D 11/04 |
| 10,164,278 B2 * | 12/2018 | Joos | ............ | H01M 8/04559 |
| 2003/0051887 A1 * | 3/2003 | Cramer | ............ | A62C 3/06 169/62 |
| 2004/0043276 A1 * | 3/2004 | Hoffjann | ............ | B01D 53/02 429/411 |
| 2004/0057177 A1 | 3/2004 | Glahn et al. | | |
| 2004/0163826 A1 * | 8/2004 | Spring | ............ | A62C 3/06 169/46 |
| 2006/0138278 A1 * | 6/2006 | Gans | ............ | B64D 41/00 244/58 |
| 2007/0172707 A1 * | 7/2007 | Hoffjann | ............ | H01M 8/04014 429/9 |
| 2008/0001026 A1 * | 1/2008 | Hoffjann | ............ | B64D 11/02 244/58 |
| 2008/0038597 A1 * | 2/2008 | Hoffjann | ............ | H01M 8/04007 429/414 |
| 2008/0133076 A1 * | 6/2008 | Formanski | ............ | B60W 10/26 701/22 |
| 2010/0193629 A1 * | 8/2010 | Breit | ............ | B64D 11/02 244/58 |
| 2010/0221642 A1 * | 9/2010 | Frahm | ............ | B64D 11/02 429/512 |
| 2010/0236796 A1 * | 9/2010 | Chattaway | ............ | A62C 37/44 169/46 |
| 2011/0308822 A1 * | 12/2011 | Seebaluck | ............ | A62C 2/06 169/45 |
| 2012/0318914 A1 * | 12/2012 | Rajashekara | ......... | B64D 41/00 244/58 |
| 2013/0126193 A1 * | 5/2013 | Gupta | ............ | B64D 37/32 169/45 |
| 2013/0210329 A1 * | 8/2013 | God | ............ | B64D 11/02 454/71 |
| 2014/0110137 A1 | 4/2014 | Ribarov et al. | | |
| 2014/0263835 A1 * | 9/2014 | Godecker | ............ | B64D 11/04 244/118.5 |
| 2015/0217153 A1 * | 8/2015 | Jones | ............ | A62C 3/08 169/62 |
| 2015/0333347 A1 * | 11/2015 | Brunaux | ............ | A62C 3/08 429/446 |
| 2016/0380280 A1 * | 12/2016 | Filangi | ............ | H01M 8/04029 429/429 |
| 2018/0001124 A1 * | 1/2018 | Klassen | ............ | A62C 3/08 |

FOREIGN PATENT DOCUMENTS

| | | | |
|---|---|---|---|
| DE | 102007054291 A1 | 4/2009 | |
| EP | 2213571 B1 | 8/2010 | |
| WO | 2006058774 A2 | 6/2006 | |
| WO | 2007039211 A1 | 4/2007 | |
| WO | 2007057188 A1 | 5/2007 | |
| WO | 2011089016 A2 | 7/2011 | |
| WO | 2013140312 A2 | 9/2013 | |
| WO | WO 2013140312 A2 * | 9/2013 | ............ A62C 3/08 |
| WO | 2014111861 A1 | 7/2014 | |

* cited by examiner

FUEL CELL DEVICES FOR FIRE PREVENTION ON-BOARD AIRCRAFT

CROSS REFERENCE TO RELATED APPLICATIONS

This application is the U.S. national stage entry of International Application Serial No. PCT/IB2016/050326, filed on Jan. 22, 2016, which application is related to and claims priority benefits from U.S. Provisional Application Ser. No. 62/106,493, filed on Jan. 22, 2015 entitled "FUEL CELL—ODA USAGE," the entire contents of which are hereby incorporated herein in their entirety by this reference.

FIELD OF THE INVENTION

Embodiments of the present invention relate generally to the field of aerospace vehicles where fuel cell system by-products are used to prevent or extinguish fire. In certain instances, the systems are be particularly used in delivering oxygen depleted air to compartments housing electrical components and/or to any other compartments where a risk of fire exists.

BACKGROUND

A number of components on-board an aircraft require electrical power for their activation. Many of these components are separate from the electrical components that are actually required to run the aircraft (i.e., the navigation system, fuel gauges, flight controls, and hydraulic systems). For example, aircraft also have catering equipment, heating/cooling systems, lavatories, power seats, water heaters, wing heaters, fuel warmers, and other components that require power as well. Specific components that may require external power include, but are not limited to, trash compactors (in galley and/or lavatory), ovens and warming compartments (e.g., steam ovens, convection ovens, bun warmers), optional dish washer, freezer, refrigerator, coffee and espresso makers, water heaters (for tea), air chillers and chilled compartments, galley waste disposal, heated or cooled bar carts/trolleys, surface cleaning, area heaters, cabin ventilation, independent ventilation, area or spot lights (e.g., cabin lights and/or reading lights for passenger seats), water supply, water line heating to prevent freezing, charging stations for passenger electronics, electrical sockets, vacuum generators, vacuum toilet assemblies, grey water interface valves, power seats (e.g., especially for business or first class seats), passenger entertainment units, emergency lighting, wing heaters for ice protection, fuel warmers, and combinations thereof. These components are important for passenger comfort and satisfaction, and many components are absolute necessities.

The relatively new technology of fuel cells provides a promising cleaner and quieter means to supplement energy sources already aboard aircrafts. A fuel cell has several outputs in addition to electrical power, and these other outputs often are not utilized. Fuel cell systems combine a fuel source of hydrogen (such as compressed hydrogen) with oxygen (such as oxygen contained in the air or oxygen provided by one or more oxygen generators) in order to produce electrical and thermal power as a main product. Water and oxygen depleted air ("ODA") are produced as by-products, which are far less harmful than $CO_2$ emissions from current aircraft power generation processes.

Additionally, aerospace vehicles and aircraft are also typically equipped with a fuel tank inerting system, which requires aircraft manufacturers to minimize flammability in fuel tanks to significantly reduce the risk of explosion. By way of background, a combination of warm fuel vapor and air in a fuel tank may be ignited by a low energy spark, and is known to be a cause of aircraft crashes. The inerting system decreases the oxygen levels of the air inside the fuel tanks. The inerting system produces inert gas, such as nitrogen enriched air, by means of an air separation module (ASM) that breaks down air into streams that are concentrated with individual components (i.e., oxygen, nitrogen, etc.). These inerting systems are typically referred to as on board inert gas generation system ("OBIGGS") or fuel tank inerting system ("FTIS").

In many cases, the supply of inlet gas to the inerting system is extracted from cabin air or from hot pressurized air output from the engine combustion chambers (bleed air). In both cases, inlet air has to be conditioned in pressure and temperature to ensure optimum performance of the OBIGGS and the inert gas distribution into tanks. When pumped by the engine compressor (i.e., bleed air inlet), the inlet air consumption decreases engine efficiency, thereby increasing fuel consumption. When pumped by a dedicated electrical compressor (i.e., cabin air inlet), this inlet air consumption also increases power consumption by increasing the power demand on the electrical compressor. These described systems also require power to be delivered directly or indirectly from the engines, which also translates into extra fuel consumption.

In addition to on-board gas tanks and cargo bay areas, electrical components aboard the aircraft may also pose a risk of fire even though such components are typically well isolated from exposure to combustible fuel vapors. This risk, however, is generally considered low enough that such electrical components are not subjected to the same scrutiny under safety regulations as fuel tanks, cargo bays, and other locations where fuel vapors may be expected to accumulate. A risk of fire may also exist on-board an aircraft in other compartments. There exists a risk exists that electrical components or other compartment areas may be subjected to excessive voltage, excessive current, or other conditions that may result in electric arc discharges, overheating of components, and/or other possible causes of fire ignition. Accordingly, new ways for adding or supplementing safety measures against fire risk for electrical components on-board aircraft may be desirable.

SUMMARY

This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In one example, there is provided an inerting system for an aircraft or other passenger transportation vehicle, comprising: a fuel cell system; a source of inert gas comprising an oxygen depleted air output of the fuel cell system; a compartment located on-board the vehicle; and a conduit configured to convey inert gas from the source of inert gas to the compartment to reduce a risk of fire ignition in the compartment or to facilitate extinguishing of fire within the compartment. The compartment may contains at least one electronic component within the compartment. Non-limiting examples of electronic components include but are not limited to at least one electronic component comprising a control panel configured to control electrical loads of food preparation devices of the galley, at least one battery, at least one of an avionics system or other navigation system, a duct comprising electrical cabling, electronics associated with the fuel cell system, electronics that operate the fuel cell system, electronics that control the fuel cell system, or electronics powered by the fuel cell system, or any combination thereof. Additionally or alternatively, there may be a heat exchanger associated with the compartment and configured to transfer heat away from the compartment.

The source of inert gas may be used to manage a hydrogen leak in the compartment. There may be provided a valve or other regulator configured to control a flow level of inert gas from the source to the compartment. The valve may be a one-way valve coupled with the compartment and configured to release inert gas from the compartment without permitting other gas to enter the compartment through the one-way valve.

The inerting system may have a plurality of separate compartments each including at least one electronic component housed therein; and a regulator or one or more valves, the regulator or one or more valves configured for selectively directing the inert gas among the plurality of separate compartments.

Additionally or alternatively, the system may include a controller; one or more processors in communication with the controller; and memory including instructions that, when executed by the one or more processors, cause the one or more processors to: in response to information received from a sensor indicating that conditions in the compartment are indicative of fire or imminent ignition therein, cause the valve or other regulator to direct inert gas from the source to the compartment.

In another example, the inerting system may include a reservoir comprising at least one section formed of flexible material that is stretchable such that a volume of the reservoir may stretch and increase a volume of the inert gas contained therein. The inerting system may feature at least one conditioner. If provided, the conditioner may include a dryer configured to remove moisture from the inert gas prior to introduction of the inert gas into the compartment; a cooler configured to reduce a temperature of the inert gas prior to introduction of the inert gas into the compartment; or a compressor configured to adjust a pressure level of the inert gas prior to introduction of the inert gas into the compartment.

Embodiments also relate to a method for preventing or helping to extinguish a fire in a compartment on-board an aircraft or other passenger transportation vehicle, comprising: providing a source of inert gas comprising an oxygen depleted air output of a fuel cell system; sensing one or more conditions in the compartment; and delivering inert gas from the fuel cell system to the compartment. The compartment may house at least one or more electronics components. Non-limiting examples of potential electronic components are outlined above and within this disclosure.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Disclosed herein are systems and processes for providing inerting systems that supply inert gas or an inert media to electrical compartments that house electrical components. The systems and processes may also supply inert gas or inert media to other compartments on-board an aircraft or other passenger transportation vehicle. The inerting systems can be powered by fuel cell systems and/or incorporate by-products of fuel cell systems as inputs to the inerting systems. While the inerting systems are discussed for use in aircrafts, they are by no means so limited and may be used in buses, trains, or other forms of transportation equipped with electrical components or other components at risk of fire generation or ignition. The inerting systems discussed herein also may be used in any other suitable environment. When powered by an appropriate fuel cell system and/or used in conjunction with other by-products from an appropriate fuel cell system, the inerting system's operation can be made independent of (or less dependent on) the vehicle's (or surrounding environment's) electrical power system.

Figure 3:
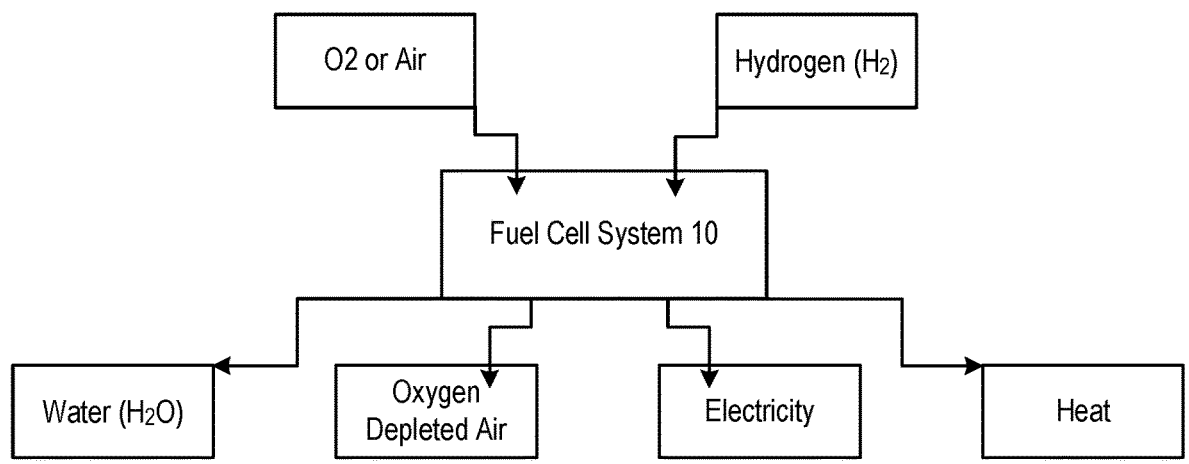
FIG. 3 is a schematic example of input elements that may be used for a fuel cell system, showing the materials needed to generate electrical power ($O_2$ and $H_2$) and the output elements ($H_2O$, oxygen-depleted air, and heat) that may be reused by additional aircraft components.

Turning now to the figures, and referring first to FIG. 3, a fuel cell system 10 is a device that converts chemical energy from a chemical reaction involving hydrogen or other fuel source and oxygen rich gas (e.g., air) into usable electrical energy. As illustrated in FIG. 3, hydrogen or another fuel source combines with oxygen in the fuel cell system 10 to generate electrical energy (power). Along with the generated electrical energy, the fuel cell system 10 produces water, thermal power (heat), and ODA as by-products. Frequently, the water, heat, and ODA by-products are not used and therefore become waste. As disclosed herein, at least some or all of the electrical energy and/or ODA may be used to power or supply an inerting system 12, such as, but not limited to, an inerting system used in an aircraft for reducing a risk of fire from electrical components or from other potentially dangerous conditions that may exist in a compartment.

Any appropriate fuel cell system 10 may be used, including, but not limited to, a Proton Exchange Membrane Fuel Cell ("PEMFC"), a Solid Oxide Fuel Cell ("SOFC"), a Molten Carbonate Fuel Cell ("MCFC"), a Direct Methanol Fuel Cell ("DMFC"), an Alkaline Fuel Cell ("AFC"), or a Phosphoric Acid Fuel Cell ("PAFC"). Any other existing or future fuel cell system technology, including but not limited to a hybrid solution, may also be used.

Figure 1:
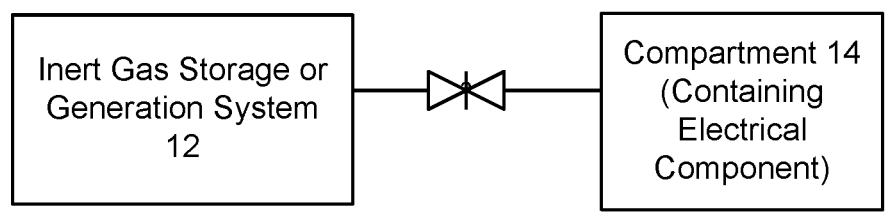
FIG. 1 is a diagram illustrating an inerting system for one or more compartments housing one or more electrical components, such as onboard an aircraft, according to certain embodiments.

As illustrated in FIG. 1, the inerting system 12 can be used to inert any compartment 14 (or multiple thereof). In one example, the compartment contains at least one electrical component. Although the remainder of this description describes delivering oxygen depleted air (ODA) to a compartment that houses one or more electrical components, it should be understood that the ODA or other inerting gas may be delivered to any other compartment that may present a hazardous or flammable or otherwise fire-potential condition. Referring now to compartments that house electrical components, various examples of different electrical components that may be inerted individually or in combination in a compartment 14 will be described with respect to FIG. 2.

Figure 2:
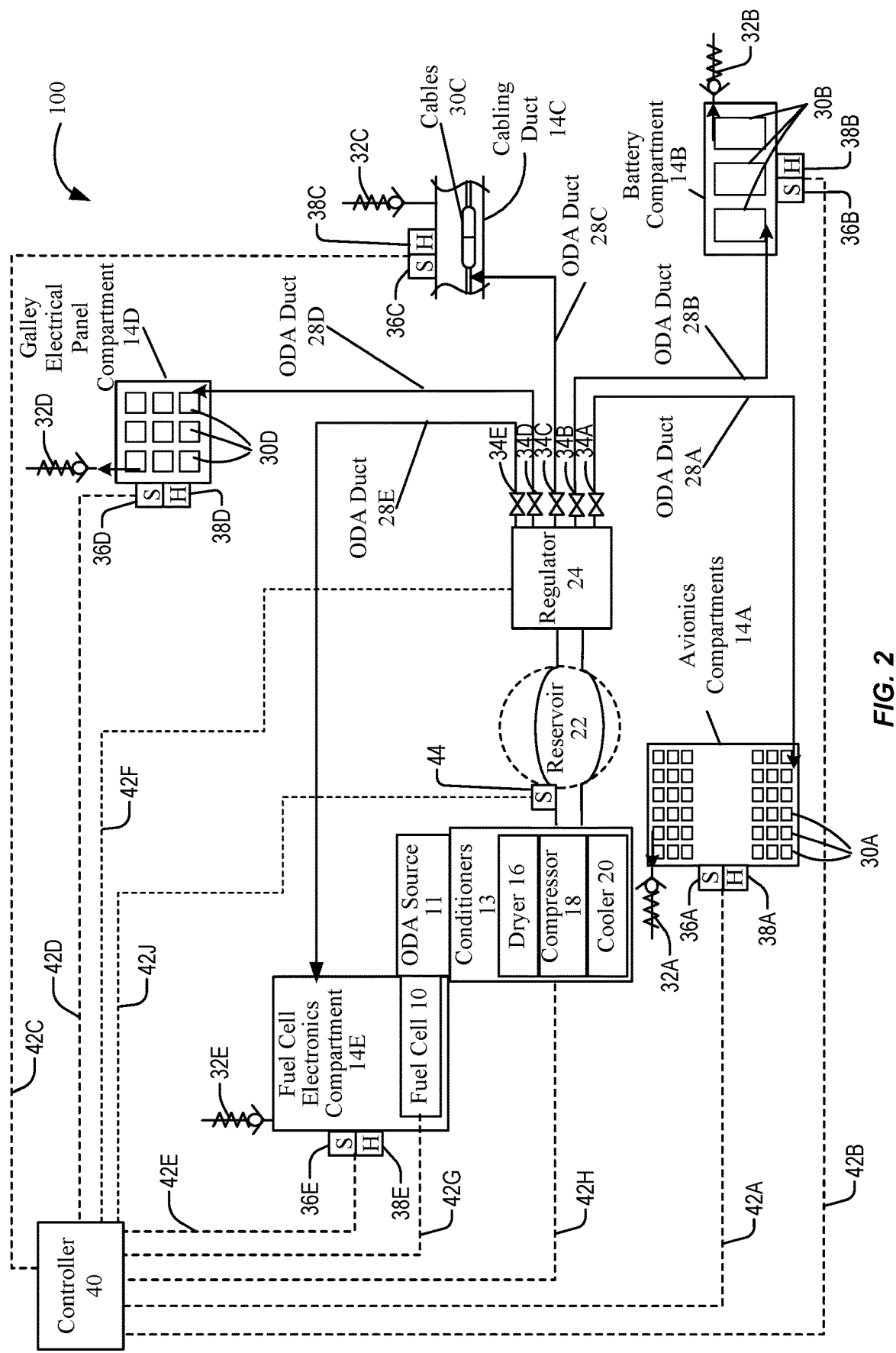
FIG. 2 is a diagram illustrating an inerting system with ODA output from a fuel cell system routed to a variety of locations housing electrical components, according to certain embodiments.

FIG. 2 is a diagram illustrating an inerting system 100 with an ODA source 11 providing an inert gas (such as ODA) that can be routed to a variety of locations aboard an aircraft. Although other inert gas may be used, for simplicity, ODA will be primarily referenced in this description. The inerting system 100 is an example of the inerting system 12. The ODA source 11 may correspond to an ODA output from a fuel cell system 10, for example, on the aircraft.

The illustrated inerting system 100 includes various ODA ducts 28 or conduits (individually identified as 28A, 28B, etc. in FIG. 2) that can convey ODA from the ODA source 11 to various compartments 14 (individually referenced as 14A, 14B, etc. in FIG. 2). Once the ODA reaches the compartments 14 via the ODA ducts 28, the ODA may be injected or spread into the compartments 14 with nozzles and/or any other suitable distribution technology. The ODA provided to the compartments 14 can reduce a risk of fire from electrical components 30 (individually identified as 30A, 30B, etc. in FIG. 2) located in or proximate the compartments 14. The ODA provided to the compartments 14 can reduce a risk of fire that may be generated by any other dangerous or flammable condition.

FIG. 2 shows various particular examples of compartments 14 and corresponding electrical components 30 that may be subject to overheating or other fire risk and that may accordingly benefit from provision of ODA for inerting purposes. As a first example, ODA may be provided to an avionics compartment 14A that houses avionics electronics 30A or other electronics for navigation or other functions of the aircraft. In some aspects, the avionics compartment 14A may be located in or near a cockpit of the aircraft.

Additionally or alternatively, ODA may be provided to a battery compartment 14B that houses one or more batteries 30B, such as may be used for startup or other processes of the aircraft. In some aspects, the battery compartment 14B may be located in a tail of the aircraft.

Furthermore, ODA may additionally or alternatively be provided to one or more cabling ducts 14C that function as a compartment to house electrical cables 30C, such as for transmitting power or data between components within the aircraft. Moreover, ODA may additionally or alternatively be provided to a galley electrical panel compartment 14D, which may house a galley electrical panel 30D, such as for managing power consumption of various food preparation devices aboard the aircraft. In some aspects, the galley electrical panel compartment 14D may be replaced or supplemented by a compartment housing an electrical panel for managing power consumption of in-flight entertainment services or other functions not directly associated with the galley.

Also, ODA may additionally or alternatively be provided to a fuel cell electronics compartment 14E, which may house electronics 30E that control, operate, and/or are powered by a fuel cell system 10. In another example, ODA could be used to mitigate fire risks due to possible hydrogen leakages around the fuel cell and hydrogen containing equipment. In other words. the use of ODA in accordance with this disclosure may be used for managing hydrogen leakage.

Although the inerting system 100 is illustrated with a single instance of each of these different types of compartments 14, the inerting system 100 may include more or fewer than all of the compartments 14 shown, and may include multiple of any particular type of compartment 14 (e.g., multiple galley electrical panel compartments 14D in the case of an aircraft with multiple galleys).

Any of the compartments 14 can include output valves 32 for exhausting gas from the compartments 14. In some embodiments, the compartments 14 may be sealed so that fluid communication is only permitted into or out of the compartment by the ducts 28 and the output valves 32. Such an arrangement may provide additional control over the conditions within the compartment 14. The output valves 32 may be one-way valves. In one example, such a one-way valve may include a spring-loaded closure mechanism that can be temporarily overcome to allow gas to escape in response to the gas reaching a sufficient predetermined pressure level. Other types of one-way valves may also be used. Non-limiting examples include but are not limited to two-way valves, spring-loaded valves, electronically-controlled valve, mechanical valves, or any other appropriate type of valve. Output valves 32 that are one-way valves may allow gas to flow out of the compartment 14 in response to additional ODA flowing into the compartment 14. Such one-way valves may prevent other gas (apart from that introduced through the corresponding ODA duct 28) from entering the compartment 14. This may reduce a risk that the compartment 14 may receive fluids that are conducive to starting or sustaining fire in the compartment 14.

The ODA source 11 is shown in communication with a variety of conditioners 13. The conditioners 13 may function to modify the characteristics of the ODA from the ODA source 11, such as to improve the fire-quenching properties of the ODA. For example, the inerting system 110 is shown with a dryer 16, a compressor 18, and a cooler 20.

The dryer 16 may reduce moisture content in the ODA. The ODA produced by the fuel cell system 10 can have a sufficiently low oxygen content to be used as an inert gas, but may also contain moisture and water vapor. Because it may be preferable to avoid introducing such moisture to sensitive electronics, the dryer 16 or another piece of equipment, such as a filter, condenser, heat exchanger, etc., may be used alone or in combination to dry the ODA prior to direct introduction into the compartments 14 housing electronic compartments 30 and/or introduction into other elements of the inerting system 100. In contrast, if electronics 30 are suitably not susceptible to moisture damage (e.g., if suitably coated or otherwise shielded from moisture), the moisture in the wet ODA may be a benefit for extinguishing and/or preventing fire. In such cases, there may be no need for the ODA to pass through a dryer 16 or other device to remove the moisture and/or water vapor prior to introducing the ODA. In such cases, the dryer 16 may be omitted and/or disabled.

The compressor 18 may adjust the pressure of the ODA. For example, this may permit changes to a mass flow of the ODA through compartments 14 or other elements of the inerting system 100. Additionally or alternatively, in some cases, the compressor 18 may provide the ODA at a pressure that alters a temperature of the ODA, which may be effective to bring the ODA into a temperature range that is unconducive to fire ignition conditions and/or to fire-sustaining conditions in a compartment 14.

The cooler 20 may adjust the temperature of the ODA. For example, the cooler 20 may correspond to any form of heat exchanger or other chiller. The cooler 20 may function to remove heat from the ODA that may have been introduced by any or all of the fuel cell 10, the dryer 16, or the compressor 18.

A reservoir 22 is also shown in the system 100 in FIG. 2. The reservoir 22 may allow generated ODA to be stored until distribution is desired. In some aspects, the reservoir 22 may include at least one section formed of a flexible material so that it may stretch and increase the volume of ODA contained therein. In some embodiments, the reservoir 22 may be associated with one or more sensors 44 that can provide information about a quantity of ODA stored in the reservoir 22.

A regulator 24 in the inerting system 100 may control amounts of ODA conveyed to various compartments 14. For example, the regulator 24 may control various valves 34 (individually identified as valves 34A, 34B, etc. in FIG. 2) that control flow through corresponding ODA ducts 28 to associated compartments 14. The regulator 24 may be configured to open any individual valve 34 or multiple valves 34 to allow the ODA to respectively flow to any individual or multiple locations. The regulator may also be configured to close any individual valve 34 or multiple valves 34 to restrict or stop the ODA flow to any individual or multiple locations.

The respective compartments 14 in the inerting system 100 shown in FIG. 2 are also provided with measurement sensors 36 (individually labeled 36A, 36B, etc.). The measurement sensors 36 may provide information about which, if any of the compartments 14 are subject to conditions that may correspond to a risk or presence of fire. The measurement sensors 36 may include any form of sensor (or combinations thereof) that can provide information about conditions in the compartment 14. For example, the measurement sensors 36 may include temperature sensors, pressure sensors, oxygen level sensors, moisture sensors, air quality sensors, smoke sensors, combinations thereof, or other sensors that may provide information indicative of whether conditions in the compartment correspond to conditions that represent a fire being present or conditions that are conducive to fire ignition.

The respective compartments 14 shown in FIG. 2 are also provided with heat exchangers 38 (individually labeled 38A, 38B, etc.). A heat exchanger 38 may transfer heat away from the compartment 14 to reduce a risk of fire or assist in extinguishing a fire. In some cases the heat exchangers 38 may be selectively operated, for example, activated or deactivated based on conditions detected for the compartments 14 by the associated measurement sensors 14.

A controller 40 can also be provided in the inerting system 100. The controller 40 may communicate with and/or control elements of the inerting system 100, such as to control an amount and/or condition of ODA provided to one or more of the compartments 14. Communication of the controller 40 with various features of the inerting system 100 is depicted in FIG. 2 along dashed lines 42 (individually labeled 42A, 42B, etc.). This communication may correspond to communication along wires or may include wireless communication. Additionally, although only communication from the measurement sensors 36 and heat exchangers 38 are shown along shared communication links (e.g., lines 42A, 42B, 42C, 42D, and 42E), other arrangements are possible, including arrangements in which measurement sensors 36 and heat exchangers 38 have distinct communication links and arrangements in which other combinations of elements share communication links.

In some embodiments, the controller 40 may receive information about conditions in compartments 14 (e.g., via measurement sensors 360) and, based on that information, control other components to affect amounts and/or conditions of ODA distribution to the compartments 14.

In an illustrative example, the controller 40 may receive information about all of the compartments 14 from measurement sensors 36A, 36B, 36C, 36D, and 36E via communication links 42A, 42B, 42C, 42D, and 42E and determine that only the avionics compartment 14A presently has a temperature corresponding to a risk of fire. The controller 40 may accordingly communicate with the regulator 24 (e.g., along communication link 42F) to cause valve 34A to open (thus communicating ODA through the corresponding ODA duct 28A to the avionics compartment 14A) and valves 34B, 34C, 34D, and 34E to remain shut or to at least partially close (thus preventing or reducing passage of ODA to the associated compartments 14B, 14C, 14D, and 14E, such as to reduce ODA consumption). The controller 40 may also activate the corresponding heat exchanger 38A for the avionics compartment 14A, such as to reduce the temperature therein away from a range conducive to fire.

The controller 40 may also determine a demand for ODA (e.g., based on information from measurement sensors 36) and control elements accordingly. In one illustrative example, the controller 40 may control operation of the fuel cell 10 (e.g., along communication link 42G) to adjust an amount of ODA produced to match a demand (e.g., reducing an operational level of the fuel cell 10 if ODA production exceeds demand or increasing an operation level of the fuel cell 10 if ODA production is less than demand). In another illustrative example, the controller 40 may communicate with the sensor 44 associated with the reservoir 22 (e.g., along communication link 42J) to determine an amount of ODA stored in the reservoir 22 and control the fuel cell 10 and/or the regulator 24 based on the amount of stored ODA. In a further illustrative example, the controller 40 may communicate with one or more of the conditioners 13 (e.g., along communication link 42H) to adjust operational levels thereof to provide ODA with characteristics matching the demand.

In some embodiments, the controller 40 may control output valves 32. For example, the controller 40 may control the output valves 32 to determine an amount or rate at which fluid is allowed to exit the compartments 14. This may allow for greater control of the conditions in the compartment 14. For example, controlling the mass-flow of ODA into the compartment 14 via an associated valve 34 in conjunction with controlling the mass-flow out of the compartment 14 may permit targeted pressures, targeted temperatures, targeted compositions of fluid, or other relevant targeted conditions to be achieved within the compartment. In some cases, the controller 40 may control a variable feature of an output valve 32 (e.g., resistance of a spring in a one-way valve) to control the function of the output valve 32.

Although much of the foregoing description describes a controller 40 that may automatically receive input and perform responsive functions, in some embodiments, the controller may represent one or more switches or other input devices by which operation of the inerting system 100 may be controlled by one or more crew members or pilots aboard the aircraft.

Figure 4:
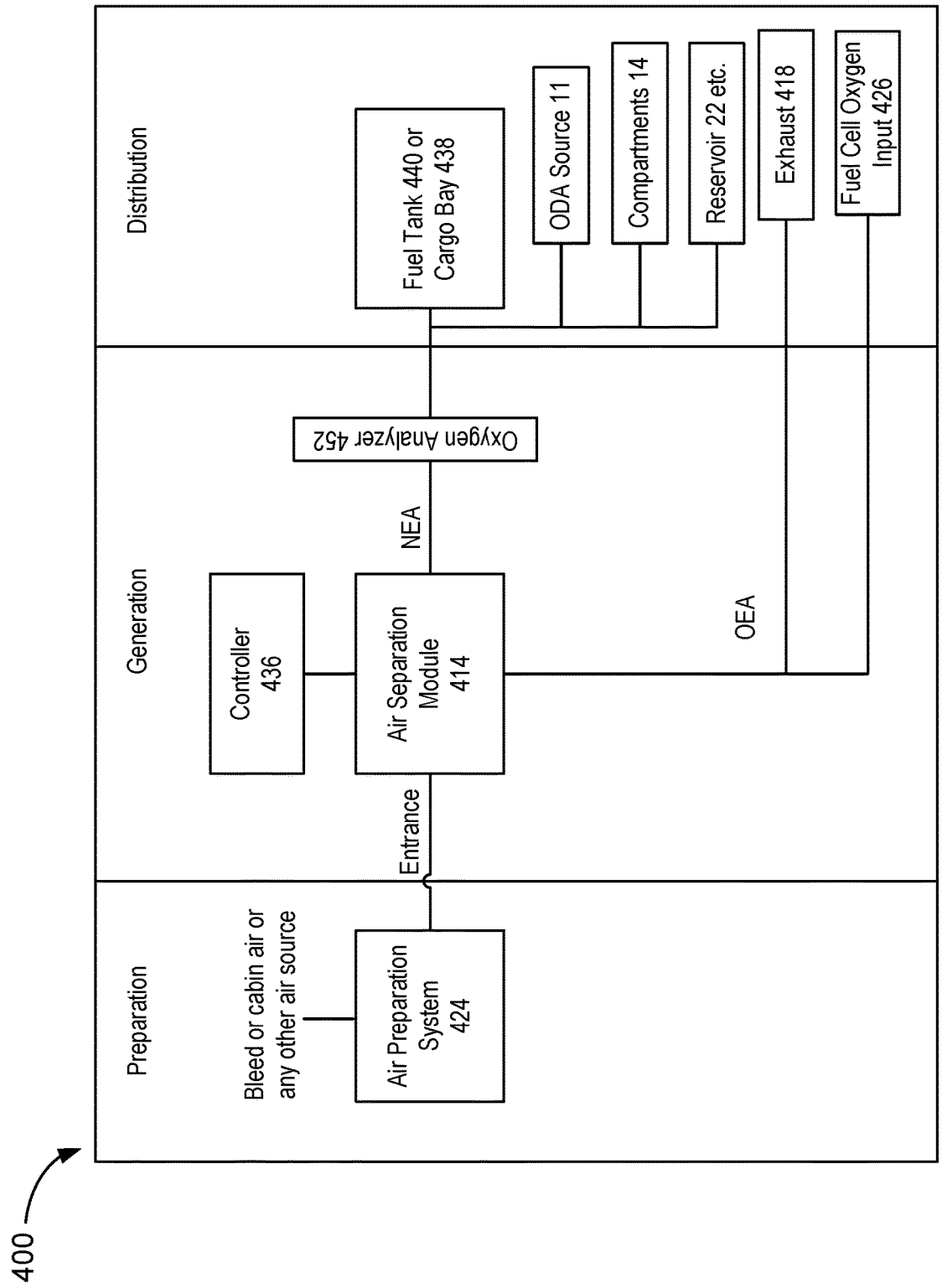
FIG. 4 is a diagram illustrating basic components of a fuel vapor inerting system according to certain embodiments.

In some embodiments, the ODA source 11 may be supplemented or replaced with another source of inert gas, such as from an independent inert gas generator and/or the fuel vapor inerting system 400 described herein with respect to FIG. 4. The ODA source 11 may additionally or alternatively send or receive inert gas to or from other sources of inert gas and/or other inerting systems. Inert gas may include any gas that, upon introduction to a volume, can change conditions in the volume to be less conducive to fire in comparison to conditions prior to introduction. For example, ODA may be an effective inert gas due to the reduced oxygen content therein providing less total oxygen for a fire's chemical reaction of combustion.

FIG. 4 illustrates components of a fuel vapor inerting system 400 in conjunction with other elements described herein. Examples of such fuel vapor inerting systems 400 are described in greater detail in PCT/IB2013/052002, flied Mar. 13, 2013 with a priority date of Mar. 19, 2012, entitled "Fuel Cell Devices for Fire and/or Explosion Prevention," published as WO/2013/140312, the entire disclosure of which is incorporated herein by reference. The fuel vapor inerting system 400 may be useful for inerting locations aboard an aircraft where fuel vapor may be likely to collect and create a risk of ignition or explosion. Although such fuel vapor inerting systems 400 are typically designed to mitigate risk of fire or explosion from fuel vapors (and not a risk of fire from electrical components), an inert gas provided from such a fuel vapor inerting system 400 may nevertheless be used to supplement or replace the ODA source 11 described above with respect to the inerting system 100. For example, the fuel vapor inerting system 400 may be an example of the inerting system 12.

The fuel vapor inerting system 400 comprises at least one air preparation system 424, at least one air separation module ("ASM") 414, and a controller 436. One or more of these elements may share structure with or interact with other elements described herein. For example, the controller 436 may be distinct from the controller 40 (and operate independently or in relationship with one another) or both elements may correspond to a single device. An oxygen analyzer 452 may also be included to monitor the oxygen content of the inert gas leaving the ASM 414.

In certain embodiments, the air preparation system 424 is included to condition hot pressurized air output from engine combustion chambers (bleed air) to a suitable temperature and pressure. For example, bleed air entering the air preparation system 424 may be up to 450° F. A heat exchanger within the air preparation system 424 cools the bleed air to an acceptable range for introduction into fuel vapor inerting system 400. For example, suitable temperatures may range from 160° F.-190° F.; however, one of ordinary skill in the relevant art will understand that any suitable temperature may be used that is compatible with the fuel vapor inerting system 400.

The ASM 414 separates an inlet gas stream (i.e., air) into a nitrogen enriched air ("NEA") stream and an oxygen enriched air ("OEA") stream. In certain embodiments, the ASM 414 is a semi-permeable hollow fiber membrane bundle contained in a pressure containment canister with three ports—a gas inlet port, an NEA outlet port, and an OEA outlet port.

The NEA stream of the fuel vapor inerting system 400 is typically routed as an inerting gas to locations where fuel vapors may be expected to accumulate, such as to a fuel tank 440 or cargo bay 438 of the aircraft. In some embodiments, an existing pipe network for transporting NEA to such locations can be retrofitted to additionally or alternatively direct NEA as an inerting gas to the ODA source 11, the compartments 14 housing electrical components 30, or other intermediary elements of the inerting system 100 described with respect to FIG. 2 (e.g., the reservoir 22 etc.). In other embodiments, a new pipe network may be constructed to transport the ODA from the fuel cell system 10 and/or the NEA from the fuel vapor inerting system 400.

In some embodiments, the OEA leaving the air separation module 414 of the fuel vapor inerting system 400 as a by-product is exhausted from the aircraft (e.g., as at 418). However, in certain embodiments, the OEA may be recycled as an oxygen input to the fuel cell system 10 (e.g., as at 426) directly or via oxygen storage for the fuel cell system 10.

One of ordinary skill in the relevant art will understand that elements described herein may be arranged or located differently than the positions shown schematically in the figures. For example, the oxygen analyzers 452 may be coupled to the fuel vapor inerting system 400 in any suitable location, arrangement, or combination thereof that provides suitable feedback for the controller 436 to optimize the efficiency and throughput of the fuel vapor inerting system 400. Similarly, the measurement sensors 36, valves 34, output valves 32, heat exchangers 38, and other elements shown in FIG. 2 may be located in any suitable location, arrangement, or combination thereof that provides suitable optimization for the efficiency and throughput of the inerting system 100.

The fuel cell system 10 may be located in any suitable location on the aircraft and may be used to supply power or other products to other aspects of the aircraft in addition to or in lieu of the inerting system 100 and/or the fuel vapor inerting system 400. Alternatively, separate fuel cell systems 10 may be used to power or supply any aspect described herein. For example, electrical power output from the fuel cell system 10 may be connected to provide power to elements of the air preparation system 424, the air separation module 414, the controller 436, and/or the oxygen analyzer 452. The fuel cell system 10 may additionally or alternatively provide power for operating the valves 34, the outlet valves 32, the conditioners 13, the regulator 24, the electronics 30, the measurement sensors 36, the heat exchangers 38, the controller 40, other elements, and/or combinations thereof. Power needed by the systems described herein may be supplied directly by one or more fuel cell systems 10 or may be supplied or supplemented by any suitable electrical energy storage (such as battery packs, ultra capacitor banks, super capacitor banks, energy storage source, etc.) charged by power generated from a fuel cell system 10 or otherwise. Supplemental power may also be supplied by a typical power source in an aircraft, such as the ground power unit or the aircraft power unit.

If the fuel cell system 10 is positioned within or near the inerting system 12, the power may be generated near the point of use and does not need to travel a long distance. As a result, power dissipation can be minimized. Moreover, if the fuel cell system 10 is positioned within or near the inerting system 12, the fuel cell system 10 may also be used to power other aircraft systems such as, but not limited to, passenger seats, passenger entertainment systems, emergency lighting, reading lights, lavatory units, etc., whether or not these systems are in the vicinity of the inerting system 12, so that the required energy/power output is more stable and there is less energy waste. More than one fuel cell system 10 may be used if needed, and the size of the one or more fuel cell systems 10 may be based on the energy/power requirements of the inerting system 12 and/or other systems.

In certain embodiments, at least one battery pack or other energy source may also be connected to the fuel cell 10, such as for charging during low periods and to provide additional power during high (peak) load periods, such as meal preparation/service times. In some embodiments, at least one ultra capacitor bank, a super capacitor bank, and/or an energy storage source may be used in place of or in conjunction with the battery pack or other energy source. The battery pack or other energy source may be part of the fuel cell system 10 or may be located in a separate location.

The inerting system 12 may include processing logic that may comprise hardware (circuitry, dedicated logic, etc.), software (such as is run on a general purpose computing system or a dedicated machine), firmware (embedded software), or any combination thereof.

Figure 5:
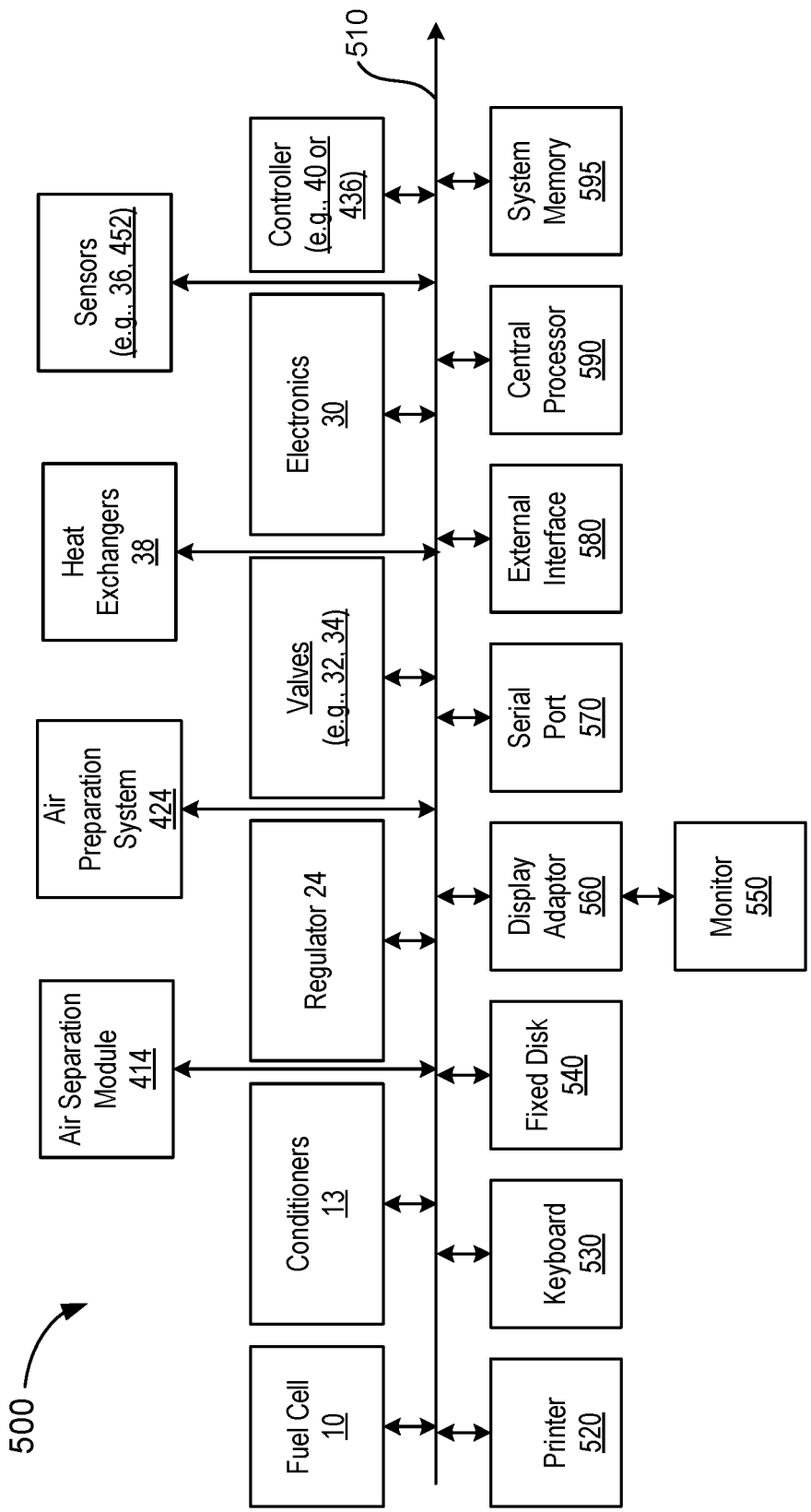
FIG. 5 is a diagram of an example of a computer system apparatus that may be used with other elements described herein.

FIG. 5 is a diagram of a computer apparatus 500, according to certain exemplary embodiments. The various participants and elements in the previously described system diagrams (e.g., the inerting system 12, the inerting system 100, the fuel vapor inerting system 400) may use any suitable number of subsystems in the computer apparatus 500 to facilitate the functions described herein. Examples of such subsystems or components are shown in FIG. 5. The subsystems or components shown in FIG. 5 may be interconnected via a system bus 510 or other suitable connection. In addition to the subsystems described above, additional subsystems such as a printer 520, keyboard 530, fixed disk 540 (or other memory comprising computer-readable media), monitor 550, which is coupled to a display adaptor 560, and others are shown. Peripherals and input/output (I/O) devices (not shown), which couple to the controller 436 or 40 can be connected to the system 500 by any number of means known in the art, such as a serial port 570. For example, the serial port 570 or an external interface 580 may be used to connect the control system 500 to a wide area network such as the Internet, a mouse input device, or a scanner. The interconnection via the system bus 510 allows a central processor 590 to communicate with each subsystem and to control the execution of instructions from a system memory 595 or the fixed disk 540, as well as the exchange of information between subsystems. The system memory 595 and/or the fixed disk 540 may embody a computer-readable medium, which may be non-transitory.

The software components or functions described in this application may be implemented via programming logic controllers ("PLCs"), which may use any suitable PLC programming language. In other embodiments, the software components or functions described in this application may be implemented as software code to be executed by one or more processors using any suitable computer language such as, for example, Java, C++ or Perl using, for example, conventional or object-oriented techniques. The software code may be stored as a series of instructions or commands on a computer-readable medium, such as a random access memory ("RAM"), a read-only memory ("ROM"), a magnetic medium such as a hard-drive or a floppy disk, an optical medium such as a CD-ROM, or a DNA medium. Any such computer-readable medium may also reside on or within a single computational apparatus, and may be present on or within different computational apparatuses within a system or network.

The invention can be implemented in the form of control logic in software or hardware or a combination of both. The control logic may be stored in an information storage medium as a plurality of instructions adapted to direct an information processing device to perform a set of steps disclosed in embodiments of the invention. Based on the disclosure and teachings provided herein, a person of ordinary skill in the art will appreciate other ways and/or methods to implement the invention.

In embodiments, any of the entities described herein may be embodied by a computer that performs any or all of the functions and steps disclosed.

The foregoing is provided for purposes of illustrating, explaining, and describing embodiments of the invention. Further modifications and adaptations to these embodiments will be apparent to those skilled in the art and may be made without departing from the scope or spirit of the invention.

That which is claimed is:

1. An inerting system for an aircraft or other passenger transportation vehicle, comprising:
   (a) a fuel cell system;
   (b) a source of inert gas comprising an oxygen depleted air output of the fuel cell system;
   (c) a compartment located on-board the vehicle;
   (d) a conduit configured to convey inert gas from the source of inert gas to the compartment to reduce a risk of fire ignition in the compartment or to facilitate extinguishing of fire within the compartment and
   (e) a one-way valve coupled with the compartment and configured to release inert gas from the compartment without permitting other gas to enter the compartment through the one-way valve,
   wherein the compartment houses one or more of:
   the fuel cell system,
   at least one electronic component,
   electronics that control, operate, or are powered by a fuel cell system, or any combination thereof,
   avionics electronics or electronics for navigation,
   one or more batteries,
   one or more electrical cables,
   at least one electrical panel,
   an electrical panel for managing power consumption of in-flight entertainment services, for managing galley functions, or for managing functions not directly associated with the galley,
   or any combination of the foregoing,
   a heat exchanger associated with the compartment and configured to transfer heat away from the compartment,
      a controller;
      one or more processors in communication with the controller; and
      memory including instructions that, when executed by the one or more processors, cause the one or more processors to:
         in response to information received from a sensor indicating that conditions in the compartment are indicative of fire or imminent ignition therein, cause the heat exchanger to activate so as to transfer heat away from the compartment.

2. The inerting system of claim 1, wherein the source of inert gas is configured to manage a hydrogen leak in the compartment.

3. The inerting system of claim 1, further comprising a valve or other regulator configured to control a flow level of inert gas from the source to the compartment.

4. The inerting system of claim 1, further comprising:
a controller;
one or more processors in communication with the controller; and
memory including instructions that, when executed by the one or more processors, cause the one or more processors to:
in response to information received from a sensor indicating that conditions in the compartment are indicative of fire or imminent ignition therein, cause the valve or other regulator to direct inert gas from the source to the compartment.

5. The inerting system of claim 1, wherein the compartment corresponds to a galley of the aircraft and wherein the galley comprises at least one electronic component comprising a control panel configured to control electrical loads of food preparation devices of the galley.

6. The inerting system of claim 1, wherein the compartment houses a duct comprising electrical cabling.

7. The inerting system of claim 1, further comprising:
a plurality of separate compartments each including at least one electronic component housed therein; and
a regulator or one or more valves, the regulator or one or more valves configured for selectively directing the inert gas among the plurality of separate compartments.

8. The inerting system of claim 1, further comprising a reservoir comprising at least one section formed of flexible material that is stretchable such that a volume of the reservoir may stretch and increase a volume of the inert gas contained therein.

9. An inerting system for an aircraft or other passenger transportation vehicle, comprising:
(a) a fuel cell system;
(b) a source of inert gas comprising an oxygen depleted air output of the fuel cell system;
(c) a compartment located on-board the vehicle;
(d) a conduit configured to convey inert gas from the source of inert gas to the compartment to reduce a risk of fire ignition in the compartment or to facilitate extinguishing of fire within the compartment; and
(e) a one-way valve coupled with the compartment and configured to release inert gas from the compartment without permitting other gas to enter the compartment through the one-way valve,
wherein the compartment houses one or more of:
the fuel cell system,
at least one electronic component,
electronics that control, operate, or are powered by a fuel cell system, or any combination thereof,
avionics electronics or electronics for navigation,
one or more batteries,
one or more electrical cables,
at least one electrical panel,
an electrical panel for managing power consumption of in-flight entertainment services, for managing galley functions, or for managing functions not directly associated with the galley,
or any combination of the foregoing,
at least one conditioner, the at least one conditioner comprising at least one of:
a dryer configured to remove moisture from the inert gas prior to introduction of the inert gas into the compartment;
a cooler configured to reduce a temperature of the inert gas prior to introduction of the inert gas into the compartment; or
a compressor configured to adjust a pressure level of the inert gas prior to introduction of the inert gas into the compartment.

10. The inerting system of claim 9, wherein the source of inert gas is configured to manage a hydrogen leak in the compartment.

11. The inerting system of claim 9, further comprising a valve or other regulator configured to control a flow level of inert gas from the source to the compartment.

12. The inerting system of claim 9, further comprising:
a controller;
one or more processors in communication with the controller; and
memory including instructions that, when executed by the one or more processors, cause the one or more processors to:
in response to information received from a sensor indicating that conditions in the compartment are indicative of fire or imminent ignition therein, cause the valve or other regulator to direct inert gas from the source to the compartment.

13. The inerting system of claim 9, wherein the compartment corresponds to a galley of the aircraft and wherein the galley comprises at least one electronic component comprising a control panel configured to control electrical loads of food preparation devices of the galley.

14. The inerting system of claim 9, wherein the compartment houses a duct comprising electrical cabling.

15. The inerting system of claim 9, further comprising:
a plurality of separate compartments each including at least one electronic component housed therein; and
a regulator or one or more valves, the regulator or one or more valves configured for selectively directing the inert gas among the plurality of separate compartments.

16. The inerting system of claim 9, further comprising a reservoir comprising at least one section formed of flexible material that is stretchable such that a volume of the reservoir may stretch and increase a volume of the inert gas contained therein.

* * * * *